United States Patent

Wang

[11] 3,725,320
[45] Apr. 3, 1973

[54] AGING OF IMPREGNATED FOAMABLE BEADS

[75] Inventor: Jerry Chi Wang, Lodi, N.J.

[73] Assignee: Dart Industries, Inc., Los Angeles, Calif.

[22] Filed: Apr. 3, 1972

[21] Appl. No.: 240,781

[52] U.S. Cl. .................260/2.5 B, 264/53, 264/345, 264/DIG. 15
[51] Int. Cl. .............................C08j 1/26, C08j 1/30
[58] Field of Search ..............264/DIG. 15; 260/2.5 B

[56] References Cited
UNITED STATES PATENTS 3,126,432   3/1964   Schuur................................260/2.5 B Primary Examiner—Murray Tillman
Assistant Examiner—Morton Foelak
Attorney—Fred S. Valles et al.

[57] ABSTRACT

A process for aging polymer beads which have been impregnated with a volatile blowing agent wherein the improvement consists of aging in an inert atmosphere at controlled temperature to reduce the volatile impregnant content. The aging can be accelerated safely with incremental temperature increases.

12 Claims, No Drawings

AGING OF IMPREGNATED FOAMABLE BEADS

BACKGROUND

This invention relates to a process for producing the volatile content of polymer beads which have previously been impregnated with a blowing agent. The invention is thus characterized as an aging process for polymer beads impregnated with volatile materials.

In the past, techniques for impregnating polymer beads such as polystyrene beads with a blowing agent such as propane, butane and the like have been disclosed. The beads are later foamed by volatilization of the blowing agent. Since the impregnating blowing agents typically used are combustible, it is desirable to reduce the volatility of the impregnated particles in order to eliminate combustion hazards during storage. Moreover, the impregnant level and the morphology of the impregnated beads dictate the quality of the foamed article. Besides having to be of proper impregnant level, the impregnated beads must assume a morphology with a uniform distribution of the impregnant throughout the bead particle in the form of a large number of minute nuclei. Foamable beads of such characteristics are generally produced by over-impregnation of raw beads with an impregnant followed by aging of the impregnated beads to remove the excess impregnant and to develop the proper morphology.

There has been no adequate disclosure of a safe and reproducible aging technique in the prior art. The prior art directed to aging such particles, as represented by polystyrene beads, can be summarized as follows.

U.S. Pat. No. 3,126,354 proposes to store the beads for 3 to 5 days at room temperature in order to reduce the volatile content by natural volatization of some impregnant.

U.S. Pat. No. 3,127,360 stores for at least 3 days in a chamber vented to the atmosphere or in a pressurized container under unspecified conditions.

U.S. Pat. Nos. 3,560,414 and 3,575,892 provide aging processes which utilize agitation in a rotating vessel for at least 24 hours under ambient conditions. The use of pressurized storage is optional.

All of these processes involve lengthy storage periods and as illustrated in U.S. Pat. No. 3,127,360, produce a quantity of volatile blowing agent which will present a fire hazard if storage is in an air tight container. Moreover, "natural" aging provides for non-uniform rates of diffusion of volatile materials, does not produce a uniform blowing agent content that is reproducible run after run, and quite often leads to imperfect molded articles.

THE INVENTION

It is an object of the present invention to provide a technique for aging polymer beads in a reduced time without producing any fire hazards and with the ability to accurately control the volatile content and the morphology of the particles.

The objects of this invention are achieved by maintaining polymer particles impregnated with a volatile impregnant in an atmosphere inert to combustion and adding controlled amounts of heat to said impregnated beads until the volatile content of the beads is reduced to the desired level.

The technique of impregnating the particles forms no part of this invention and any technique known in the art can be utilized. For instance, in a specific embodiment of this invention pertaining to aging of polystyrene beads, any of the impregnation methods disclosed in the aforementioned patents can be used. However, it should be noted that the invention is adapted for use with other polymer beads and various other impregnants. For instance, the invention can be used with advantage in the aging of polyvinyl chloride, polyethylene and ABS particles impregnated with a suitable blowing agent. Also, the aging technique of the invention is applicable to impregnants other than hydrocarbons, such as fluorocarbons and chlorinated hydrocarbons. Among the latter group methylene chloride is a particularly suitable impregnant. Although the invention is not limited to any specific particle size, the process is used with advantage with beads in the 20–50 mesh range (Tyler screen).

The aging of the impregnated beads is carried out in a closed vessel having an inlet and an outlet and preferably equipped with an agitator such as a ribbon blade agitator. In the process, intermittent or continuous agitation is an optional feature which is recommended to enhance the efficiency and speed of the process. The vessel is usually equipped with means for providing temperature control, e.g., it can be a jacketed vessel wherein a heating medium such as hot water is passed through the jacket during the aging cycle, or it can be an electrically heated vessel. The vessel can be the same vessel employed in the impregnation or a separate vessel, whichever is more consistent with the technique of impregnation. Before the charging of the impregnated beads to the vessel and during the course of the aging a gas stream is at least intermittently passed through the vessel to provide the inert atmosphere therein. The composition of the gas depends upon the nature of the volatile impregnant, i.e., if the impregnant is a volatile combustible hydrocarbon such as propane, butane and the like, the gas should be one that does not support combustion. Typical examples of a gas suitable for this purpose are nitrogen, argon, carbon dioxide, helium and the like. However, if the volatile impregnant is non-combustible, other inert gases such as air could also be used. The flow of the inert gas, whether intermittent or continuous should be at a rate of at least 0.5 cubic feet per minute (CFM) per 100 pounds of beads. Since it usually may be desired to reclaim the volatiles from the gaseous effluent from the aging vessel, it is preferred that the flow rate does not substantially exceed about 6 SCFM/100 lbs. of beads (measured at 32°F and 1 atmosphere) to obtain an efficient and economical recovery operation. The recovered volatiles can be removed in the impregnation of the polymer beads and the inert gases leaving the recovery zone can be recycled back to the aging vessel.

As indicated above, the addition of heat can be provided through the vessel wall, in which case the inert gas inlet temperature is maintained at a relatively low level. In another embodiment the heat is provided by the inert gas flowing through the aging vessel, in which case the gas is heated to a suitable temperature prior to its introduction to the vessel. Alternately, a combination of the above two methods can be used. In one preferred embodiment of the invention, wherein agitation is employed, some heat is also added to the system in the form of frictional heat.

The addition of heat should be controlled to achieve a slow and gradual temperature increase of the beads during the aging step. In order to ensure uniform aging in the bead batch and to preserve the cell structure of the particles it is essential that the heat input is controlled to provide bead temperatures below about 80°F for about the first 2 hours of the aging and preferably this temperature should not be exceeded during the first 6 hours of the aging. After the initial period, the heat input can be increased, e.g., by increasing the inlet temperature of the inert gas flowing through the vessel, and the subsequent aging of the beads can be permitted at higher bed temperatures. However, the maximum bed temperature during the entire aging step should not exceed about 110°F. The inlet temperature of the inert gas is suitably maintained in the range from about 50° to about 110°F during the aging and preferably between about 60°F and 90°F. Within the above broad range of inlet temperatures, it is preferred to initially use a low temperature and increasing it in increments.

The volatile content of the beads is monitored during the aging, which is discontinued as soon as the content has been reduced to a desired level. After aging the beads can be charged directly to the next processing step or they can be discharged into closed vessels such as lined fiberpack drums for safe storage in the presence of the inert atmosphere.

Use of this invention has been found to require considerably less aging times than those of the prior art processes. Moreover, the use of the invention assures uniformity of volatiles throughout each bead particle and also reproducible results run after run. The beads, when aged in accordance with the invention and when subsequently expanded, will produce foamed articles with small uniform cell structure and excellent physical strength and dimensional stability.

A specific embodiment of the invention pertains to the aging of polystyrene beads impregnated with a lower aliphatic hydrocarbon in the $C_3$ to $C_6$ range. After impregnation the beads are drained or separated from the impregnation medium, e.g., by flashing off excess impregnant. The impregnated beads thus obtained have a volatile content typically ranging from about 8 to about 10 weight percent. The beads are then aged in accordance with the process of the invention for a period of time sufficient to reduce the volatile hydrocarbon impregnant content to the desired level. This level can vary and is affected by a number of factors, such as the required initial volatile content of the beads charged to the foaming operation and the storage time between the aging operation and the foaming operation. In order to form high quality molded articles of proper cell structure the polystyrene beads should uniformly contain from about 4 to about 7 weight percent impregnant and preferably from about 4.5 to about 6 weight percent when charged to the foaming operation. Lack of uniformity will produce articles and beads with translucent appearance and collapsed cells. Loss of volatiles occurs to some degree during storage of aged beads. The rates of loss of volatiles can be easily determined by simple techniques for each impregnant simulating the storage conditions. Thus the final level of volatile content of the beads at the end of an aging run is dictated by the volatile content desired at the beginning of the foaming operation and the length of storage time of the aged beads prior to further processing.

The quality of the aged beads may be judged from their appearance and the presence of nucleation. The initial unimpregnated polystyrene beads resemble glass beads, shiny and transparent. In contrast, properly aged beads have a hazy appearance and are opaque. When examined under a 20X microscope, these beads are shown to have numerous minute particles (nuclei) populating throughout the bead particle. These precipitated nuclei vary in size, ranging from that not measurable under 20X magnification to 0.6 mils. Improperly aged beads resemble the initial material, glassy and transparent, either not having any precipitated nuclei or having only a few countable large particles. Aged beads having a high density of precipitated particles of size under 0.4 mils are most suitable for cup molding use. These materials will expand to foamed objects having a uniform fine cell structure with excellent mechanical strength.

The following examples are provided for illustration of the invention.

EXAMPLE 1

Polystyrene beads having an average particle size of 30–40 mesh (Tyler screen) were dry blended with zinc stearate to provide a thin coating of zinc stearate on the beads amounting to about 0.07 weight percent. The coated beads were added to a jacketed vessel equipped with an agitator. After purging of the vessel with nitrogen to exclude air, about 1.2 pounds of liquified normal butane per pound of polystyrene beads were pumped into the vessel maintained at 45 psig. Hot water was circulated through the jacket of the vessel to gradually heat the agitated bead slurry from room temperature to about 115°F while the pressure built up to about 60–70 psig. After impregnation for about 2 hours cooling water at about 60°F was supplied to the jacket, the vessel was vented and drained and excess impregnant was removed from the bead surfaces by holding the batch in the vessel for 1½ hours, resulting in about 9.3 weight percent volatiles (butane) in the beads.

EXAMPLE 2

Three hundred pounds of the beads from Example 1 were charged to a jacketed Strong-Scott blender equipped with a low speed double blade ribbon agitator and having a volume of 16 cubic feet. The temperature of the bed of beads was measured by means of temperature gauges. Nitrogen gas was passed at a rate of 3 SCFM/100 lbs. of beads through the chamber by means of a sparging nozzle mounted on the end wall below the bed surface of the beads. The inlet temperature of the nitrogen gas was regulated by using a heat exchanger which temperature was maintained at 75°F for the first 4 hours and 80°F for the subsequent 11 hours. At the end of the 15 hour aging run the volatile content of the beads had been reduced to 5.8 weight percent. The bed temperature rose from 60° to 65°F during the first two hours of aging, to 70°F in another 4 hours and was maintained at approximately this temperature for the remainder of the aging run. Circulating cooling water was supplied to the vessel jacket during the latter part of the experiment for bed temperature control. Examination of the aged beads under microscope (20X magnification) showed the material to be of excellent quality for further processing.

EXAMPLE 3

A 300 pound batch of polystyrene beads prepared as in Example 1 and having a volatile content of 8.5 weight percent was aged in the equipment and at the same nitrogen rates as in Example 2. The aging was carried out for 24 hours and the nitrogen inlet temperature was maintained at 70°F for the first 8 hours, 75°F for the next 4 hours and at 80°F for the last 12 hours. The bed temperature was allowed to increase gradually from 64° to 70°F during the first 6 hours, then to 72°F at the end of the 17th hour and finally to 75°F. Bed temperature control was achieved by circulating cooling water through the vessel jacket during the latter part of the run. The volatile content of the aged beads was 5.4 weight percent. Microscopic examination showed the material to have excellent structure.

EXAMPLE 4

Three hundred pounds of butane impregnated polystyrene beads were prepared according to the procedure of Example 1, resulting in a volatile content of 9.5 weight percent. The impregnated beads were aged in the equipment of Example 2 using a nitrogen rate of 4 SCFM/100 lbs. of beads. The run lasted 24 hours and the inlet nitrogen temperature was maintained at 75°F for the first 4 hours, 80°F for the next 8 hours and 90°F for the last 12 hours, at the end of which the beads contained 5.0 weight percent butane. The temperature of the beads was increased as follows: 0 – 1st hour 50°–60°F; 1 – 6th hour 70°–80°F; 6th – 12th hour, 80°F; 12th – 24th hour 80°–84°F. Cooling water was circulated through the jacket during the end of the experiment. A material of excellent quality was obtained as judged by examination under 20X magnification.

EXAMPLE 5

This control example demonstrates the detrimental effect of excessive bed temperatures the first few hours of aging. Three hundred pounds of polystyrene beads were impregnated under the conditions set forth in Example 1 resulting in a butane content of 9.5 weight percent. The impregnated beads were charged to the vessel of Example 2, and the bed was heated by friction heat from agitation and by a steam tracing line around the vessel. The nitrogen flow rate was maintained at 3 SCFM/100 lbs. of beads and its temperature was maintained at 70°F for 3 hours and at 75°F for another 3 hours. The bed temperature rose rapidly from about 60°F at the start of the run to 98°F at the end of 6 hours, the intermediate hourly temperatures being 77°, 81°, 85°, 88° and 90°F. The run was discontinued after the 6th hour, since examination of the beads revealed that they had turned translucent and the cell structure had partially disappeared due to collapse of cells in the beads. The final volatile content of the beads was not measured.

EXAMPLE 6

This example demonstrates excellent aging is achieved in operations employing intermittent agitation and nitrogen flow. Impregnated polystyrene beads prepared in accordance with the method of Example 1 and having a butane content of 8.4 weight percent were charged to the vessel of Example 2. Nitrogen was passed through the vessel at a rate of 4.5 SCFM/100 lbs. of beads for the first hour of the aging run and then again once every 8 hours for 1 hour during the 48 hour run. The beads were agitated during the periods of nitrogen flow. Samples of the beads were analyzed after each 8 hour period. The nitrogen inlet temperatures and bead butane contents are shown in Table I.

TABLE I

| Period | $N_2$ Inlet Temp.-°F | Butane Content - wt % at End of Period |
|---|---|---|
| 1 | 70 | 7.0 |
| 2 | 80 | 6.4 |
| 3 | 80 | 5.8 |
| 4 | 90 | 5.5 |
| 5 | 90 | 5.3 |
| 6 | 90 | 5.2 |

EXAMPLE 7

This example provides a comparison between bead aging in nitrogen (previous Examples) and aging in the absence of an inert atmosphere.

Butane-impregnated polystyrene beads initially at 9.4 weight percent volatile content and prepared in accordance with the procedure of Example 1, were aged in an enclosed, agitated, externally heated vessel blanketed with butane atmosphere. The vessel was maintained at approximately 1 psig. The temperature of the bead bed was kept at about 60°F for the first 20 hours and was raised 5°F each time for each subsequent 20 hour period. At the end of the 20 hour period at about 90°F, i.e., after 120 hours total aging time, the volatile content of the beads was still 6.4 weight percent.

EXAMPLE 8

A comparison with prior art techniques of natural aging was performed on impregnated polystyrene beads produced substantially as described in Example 1. 900 pounds of the material was found to age down from 9.6 weight percent butane to 6.1 weight percent butane in 240 hours of storage at room temperature in a plastic lined cardboard container and to about 5.6 percent after the next 66 hours.

What is claimed is:

1. A process for aging unexpanded synthetic resin particles impregnated with a volatile impregnant which comprises: maintaining in an aging zone a bed of impregnated unexpanded resin particles initially containing above 7 percent by weight of impregnant; at least intermittently passing an inert gas to said aging zone, said inert gas having an inlet temperature in the range from about 50° to about 110°F; maintaining substantially atmospheric pressure in said aging zone; maintaining the temperature of the bed below about 80°F for at least the first 2 hours of the aging, and recovering aged unexpanded particles having a volatile content in the range from about 4 to about 7 percent by weight.

2. The process of claim 1, wherein the particles at least intermittently are agitated having contact with said inert atmosphere.

3. The process of claim 1, wherein the particles comprise styrenic beads and the impregnant is a lower aliphatic hydrocarbon having 3–6 carbon atoms.

4. The process of claim 1, wherein for the first 6 hours of said period of time the temperature of the particles are maintained below about 80°F.

5. The process of claim 1, wherein the flow rate of inert gas is about 0.5 to about 6 standard cubic feet per minute per 100 pounds of synthetic resin particles.

6. The process of claim 1, wherein the inert gas is nitrogen.

7. The process of claim 1, wherein the inlet temperature of the inert gas is increased in increments during the duration of the aging.

8. The process of claim 1, wherein the inert gas is recycled with recovery of impregnant.

9. The process of claim 1 wherein the volatile content of the recovered aged unexpanded particles is between about 4.5 and about 6 weight percent.

10. The process of claim 1 wherein the unexpanded resin particles initially contain from about 8 to about 10 percent by weight of impregnant.

11. The process of claim 3, wherein the particles initially contain from about 8 to about 10 weight percent butane.

12. A process for aging unexpanded synthetic resin particles impregnated with a volatile impregnant which comprises: maintaining in an aging zone a bed of impregnated unexpanded particles initially containing above 7 percent by weight of impregnant; maintaining substantially atmospheric pressure conditions within said zone during the aging; passing an inert gas through said bed of particles having an inlet temperature in the range from about 50° to about 110°F; maintaining the temperature of the bed below about 80°F for at least about the first 2 hours of the aging; increasing the inlet temperature of the inert gas in increments within the aforementioned range during the aging, and recovering aged, unexpanded particles having a volatile content in the range from about 4 to about 7 percent by weight.

* * * * *